US007037195B2

(12) United States Patent
Schneider et al.

(10) Patent No.: US 7,037,195 B2
(45) Date of Patent: May 2, 2006

(54) METHOD AND APPARATUS FOR AWARDING A BONUS ON A NETWORK OF ELECTRONIC GAMING DEVICES DURING A PRE-DETERMINED TIME PERIOD

(75) Inventors: Richard J. Schneider, Las Vegas, NV (US); Cara L. Iddings, Las Vegas, NV (US); Lawrence R. Pitman, Corvallis, OR (US)

(73) Assignee: Acres Gaming Incorporated, Las Vegas, NV (US)

( * ) Notice: Subject to any disclaimer, the term of this patent is extended or adjusted under 35 U.S.C. 154(b) by 546 days.

(21) Appl. No.: 10/189,041

(22) Filed: Jul. 2, 2002

(65) Prior Publication Data

US 2003/0027638 A1 Feb. 6, 2003

Related U.S. Application Data

(60) Provisional application No. 60/303,107, filed on Jul. 2, 2001.

(51) Int. Cl.
*A63F 13/00* (2006.01)
*A63F 9/24* (2006.01)
*G06F 17/00* (2006.01)
*G06F 19/00* (2006.01)

(52) U.S. Cl. ........................... 463/25; 463/16; 463/26; 463/27

(58) Field of Classification Search ............ 463/16–29, 463/40–43
See application file for complete search history.

(56) References Cited

U.S. PATENT DOCUMENTS

| | | | | |
|---|---|---|---|---|
| 4,258,838 | A | 3/1981 | Rockola et al. | 194/1 |
| 4,685,677 | A * | 8/1987 | Demar et al. | 463/23 |
| 5,513,846 | A * | 5/1996 | Niederlein et al. | 273/143 R |
| 5,655,961 | A | 8/1997 | Acres et al. | 463/27 |
| 5,743,798 | A | 4/1998 | Adams et al. | 463/17 |
| 5,967,892 | A | 10/1999 | Shoemaker, Jr. | 463/7 |
| 6,110,043 | A * | 8/2000 | Olsen | 463/27 |
| 6,146,273 | A | 11/2000 | Olsen | 463/27 |
| 6,203,430 | B1 * | 3/2001 | Walker et al. | 463/20 |
| 6,210,277 | B1 | 4/2001 | Stefan | 463/27 |
| 6,254,483 | B1 | 7/2001 | Acres | |
| 6,656,048 | B1 * | 12/2003 | Olsen | 463/25 |
| 6,758,749 | B1 * | 7/2004 | Krintzman | 463/25 |
| 2002/0177480 | A1 * | 11/2002 | Rowe | 463/25 |
| 2004/0102243 | A1 * | 5/2004 | Olsen | 463/25 |
| 2004/0162134 | A1 * | 8/2004 | Walker et al. | 463/20 |

FOREIGN PATENT DOCUMENTS

WO WO 97/12338 4/1997

OTHER PUBLICATIONS

International Search Report for PCT/US02/21163 dated Sep. 18, 2002.

* cited by examiner

*Primary Examiner*—Xuan M. Thai
*Assistant Examiner*—Binh-An D. Nguyen
(74) *Attorney, Agent, or Firm*—Marger Johnson & McCollom PC

(57) ABSTRACT

Embodiments of the invention provide a time-based bonus system that can be pre-configured to award a certain amount of money to players of networked gaming devices over a certain time period. The amount of bonus money in a bonus pool is predetermined by a casino or other gaming network operator. Additionally, the total amount of bonus money in a particular bonus pool can be divided into multiple smaller bonuses, which can be distributed to many players over the time period in which the bonus pool is operating.

27 Claims, 6 Drawing Sheets

200

PAYOUT TABLE FOR BONUS A 210

| INDEX | AMOUNT 1 | AMOUNT 2 | AMOUNT 3 | AMOUNT 4 | AMOUNT 5 | • • • | AMOUNT n |
|---|---|---|---|---|---|---|---|
| 0 | 0 | 0 | 0 | 0 | 0 | | 0 |
| 1 | 1500 | 1500 | 1500 | 100 | 100 | | 100 |
| 2 | 2500 | 2500 | 2500 | 2500 | 2500 | | 2500 |
| 3 | 25,000 | 0 | 0 | 0 | 0 | | 0 |
| 4 | 100 | 100 | 100 | 100 | 100 | | 25,000 |
| 5 | 1000 | 2000 | 3000 | 4000 | 5000 | | 10,000 |
| 6 | 10,000 | 10,000 | 10,000 | 10,000 | 10,000 | | 0 |
| 7 | 0 | 0 | 0 | 0 | 0 | | 50,000 |
| 8 | 1,000,000 | 0 | 0 | 0 | 0 | | 0 |

FIG.3

| TIME SLOT | |
|---|---|
| 1 | |
| 2 | |
| 3 | |
| 4 | |
| 5 | |
| 6 | WINNER |
| 7 | |
| 8 | |
| 9 | |
| 10 | |
| 11 | |
| 12 | WINNER |
| 13 | |
| 14 | |
| 15 | |
| 16 | |
| 17 | |
| 18 | WINNER |
| 19 | |
| 20 | |
| 21 | |
| 22 | |
| 23 | |
| 24 | WINNER |
| 25 | |
| 26 | |
| 27 | |
| 28 | |
| 29 | |
| 30 | WINNER |

FIG.5A

| TIME SLOT | |
|---|---|
| 1 | |
| 2 | |
| 3 | WINNER |
| 4 | |
| 5 | |
| 6 | |
| 7 | |
| 8 | |
| 9 | |
| 10 | |
| 11 | |
| 12 | |
| 13 | WINNER |
| 14 | |
| 15 | |
| 16 | |
| 17 | |
| 18 | |
| 19 | |
| 20 | |
| 21 | |
| 22 | |
| 23 | WINNER |
| 24 | |
| 25 | |
| 26 | |
| 27 | WINNER |
| 28 | |
| 29 | |
| 30 | WINNER |

FIG.5B

| TIME SLOT | |
|---|---|
| 1 | |
| 2 | |
| 3 | |
| 4 | |
| 5 | |
| 6 | |
| 7 | |
| 8 | WINNER |
| 9 | |
| 10 | WINNER |
| 11 | |
| 12 | |
| 13 | |
| 14 | |
| 15 | |
| 16 | |
| 17 | |
| 18 | |
| 19 | |
| 20 | |
| 21 | |
| 22 | WINNER |
| 23 | |
| 24 | |
| 25 | WINNER |
| 26 | |
| 27 | |
| 28 | WINNER |
| 29 | |
| 30 | |

FIG.5C

| TIME SLOT | |
|---|---|
| 1 | |
| 2 | |
| 3 | |
| 4 | WINNER |
| 5 | |
| 6 | WINNER |
| 7 | |
| 8 | |
| 9 | |
| 10 | |
| 11 | WINNER |
| 12 | |
| 13 | |
| 14 | |
| 15 | |
| 16 | |
| 17 | WINNER, WINNER |
| 18 | |
| 19 | |
| 20 | |
| 21 | |
| 22 | |
| 23 | |
| 24 | |
| 25 | |
| 26 | |
| 27 | |
| 28 | |
| 29 | |
| 30 | |

FIG.5D

METHOD AND APPARATUS FOR AWARDING A BONUS ON A NETWORK OF ELECTRONIC GAMING DEVICES DURING A PRE-DETERMINED TIME PERIOD

CROSS REFERENCE TO RELATED APPLICATIONS

This application claims priority from provisional application 60/303,107, filed Jul. 2, 2001, the contents of which are incorporated herein by reference.

TECHNICAL FIELD

This disclosure relates to networked gaming devices, and, more specifically, to a system for providing bonuses for networked gaming devices independent of winning pay tables of the devices themselves.

BACKGROUND OF THE INVENTION

Gaming devices provide an opportunity for a user to play a variety of popular games on the machines, such as slot-type games, video adaptations of standard card games such as poker and blackjack, and many other types of games. Modern gaming devices are able to forward events that occur on the gaming devices over a computer network to a central system host or master controller. Examples of such events include coins or other value being entered into the machine, button selections and other actions made by the player, and an amount that the machine credits or pays out to the player as winnings. When the gaming machines are properly equipped, the central system can also control at least some portions of the gaming devices.

Another system that can be controlled by the central system, or a process coupled to the central system, is a bonus system for the gaming devices, and specifically a bonus system that is above and beyond the standard winning pay tables for the gaming devices.

Because there are times in a casino when gaming devices are not used as much as others, in an effort to make players more willing to play the games in slow times, it is desirable to be able to modify the effective payback of the gaming devices. Specifically, bonus systems are known that pay awards above and beyond what the gaming devices pay according to their own standard winning pay tables. Because the bonuses are added to the standard winnings from a gaming device, the players effectively have a higher chance of winning more money than when the additional bonuses are not paid. Therefore, more players are enticed to play at casinos having gaming devices coupled to a gaming network that generates the additional bonuses than at casinos that do not use such bonusing systems.

A typical way to administer paying an additional bonus is to accumulate a bonus pool each time one of the participating gaming devices is played. Once the minimum bonus pool level is reached, it is distributed—either to the gaming device machine that caused the minimum pool level to be reached, or to another active gaming device. U.S. Pat. No. 6,375,569B2, the teachings of which are specifically incorporated herein in their entirety, teaches such bonusing methods. However, because the bonus levels and overall time period in which bonuses can be paid is dependent on how many gaming devices are participating in the bonus pool, and dependent on the rate of usage of such devices, a casino can have difficulty in clearly explaining to its patrons the actual benefit conferred on them by participating in their bonusing system.

Embodiments of the invention address these and other deficiencies in the prior art.

BRIEF DESCRIPTION OF THE DRAWINGS

The description may be best understood by reading the disclosure with reference to the accompanying drawings.

FIG. 3 is a chart showing a payout table of an example bonus pool.

FIGS. 5A, 5B, 5C, and 5D are charts showing winning timeslots selected out of potential winning timeslots.

DETAILED DESCRIPTION OF THE PREFERRED EMBODIMENTS

Embodiments of the invention provide a time-based bonus system that can be pre-configured to award a certain amount of money to players of networked gaming devices over a certain time period. A bonus system includes a number of individual bonus pools, each of which can run for a given duration at a particular time on Electronic Gaming Machines (EGMs). The amount of bonus money in a bonus pool is pre-determined by a casino or other gaming network operator. Additionally, the total amount of bonus money in a particular bonus pool can be divided into multiple smaller bonuses, which can be distributed to many players over the time period in which the bonus pool is operating.

The time-based bonus system allows a casino to specify in great detail for each bonus period: the total amount of a bonus, the ways in which the bonus is divided if the bonus is divided, the duration of the bonus period, when within the bonus period the payouts will be made, which gaming devices that are coupled to the gaming network are eligible to participate in the bonus payouts, how the bonus payouts are to be made, and how to signal to casino patrons that a bonus payout has been made, among other details. Further, the casino can schedule when and how often a particular bonus pool period will occur. For instance the casino may schedule a bonus pool to operate every other hour of each weekday. Even further, the casino may configure multiple types of bonus pools, each differing in any of the variables listed above, and schedule them in advance for different times of the day, week, and month, and for special holidays or promotions.

Figure 1:
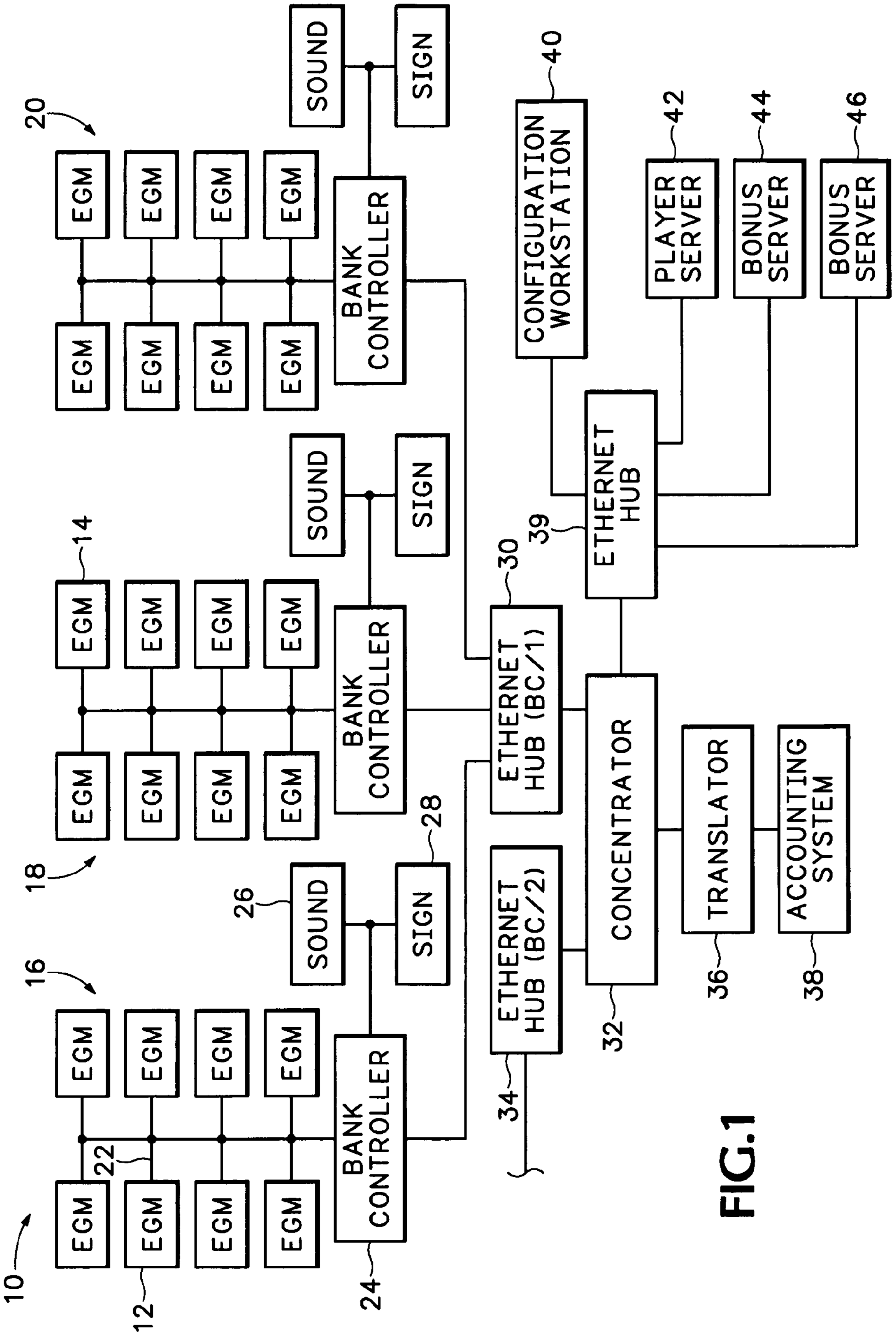
FIG. 1 is a schematic diagram of a computer gaming network on which embodiments of the invention operate.

The bonus system according to embodiments of the invention operates on a gaming computer network. An example modern gaming network is shown in FIG. 1. FIG. 1 is identical to FIG. 1 of U.S. Pat. No. 6,254,483B1, assigned to the assignee of the present invention, the teachings of which are incorporated herein in their entirety. In FIG. 1, indicated generally at 10 is a block diagram illustrating electronic gaming machines (EGMs), like EGMs 12, 14, which are interconnected by a computer network. Shown in the gaming network 10 are three banks of EGMs, indicated generally at 16, 18, and 20. Each separate EGM is connected via a network connection, like connection 22, to a bank controller 24. In embodiments of the invention, each bank controller 24 includes a processor that facilitates data communication between the EGMs in its associated bank and the other components on the network. The bank controller 24 also includes audio capabilities, like a CD or DVD ROM drive coupled to an audio board or sound card for transmitting digitized sound effects, such as music and the like, to a speaker 26 responsive to commands issued over the network 10 to bank controller. The bank controller 24 is also connected to an electronic sign or screen 28 that displays information, such as scrolling, flashing, or other types of messages that indicate jackpot amounts and the like, which are visible to players of machines on bank 16. These message displays 28 are generated and changed responsive to commands issued over the network 10 to the bank controller 24. Each of the other banks 18, 20 of EGMs include associated bank controllers, speakers, and signs as shown, which operate in substantially the same manner.

A network connector, such as an Ethernet hub 30 connects each of the bank controllers associated with banks 16, 18, 20 of EGMs to a concentrator 32. Another Ethernet hub 34 connects similar bank controllers (not shown), each associated with an additional bank of EGMs (also not shown), to the concentrator 32. The concentrator 32 functions as a data control switch to route data from each of the banks to a translator 36. The translator 36 includes a compatibility buffer between the concentrator 32 and a proprietary accounting system 38. The translator 36 functions to place all the data gathered from each of the bank controllers into a format compatible with an accounting system 38. The translator 36 could be implemented by a microcomputer including a microprocessor and operating system, such as an Intel Pentium microprocessor running Microsoft Windows NT 4.0.

Another Ethernet hub 39 is connected to a configuration workstation 40, a player server 42, and to bonus servers 44, 46. Hub 39 facilitates data flow to or from workstation 40 and servers 42, 44, 46.

The configuration workstation 40 has a user interface that allows portions of the network 10 and the servers 42, 44, 46 to be set up and modified. The configuration workstation 40 could include a personal computer having a keyboard, monitor, microprocessor, memory, an operating system, and a network card coupled to the Ethernet hub 39.

The player server 42 includes a microcomputer that is used to track data of players using the EGMs. Another function of the player server 42 is to control messages that appear on displays associated with each EGM. The player server 42 may be embodied in a microcomputer including, for instance an Intel Pentium Processor, Microsoft operating system and a network card to couple the server to the Ethernet hub 39.

Bonus servers 44, 46 each are embodied by a microcomputer and are used to control bonus applications or bonus systems on the gaming network 10. Each bonus system includes a set of rules for awarding jackpots in excess of those established by the winning pay tables of each EGM. Some bonus awards may be made randomly, while others may be made to link to groups of EGMs operating in a progressive jackpot mode. Examples of such bonuses and networks used to implement them include those as described in U.S. Pat. Nos. 6,319,125 and 5,655,961, both of which are assigned to the assignee of the present invention, and the teachings of both of which are incorporated herein in their entirety for all purposes.

Figure 2:
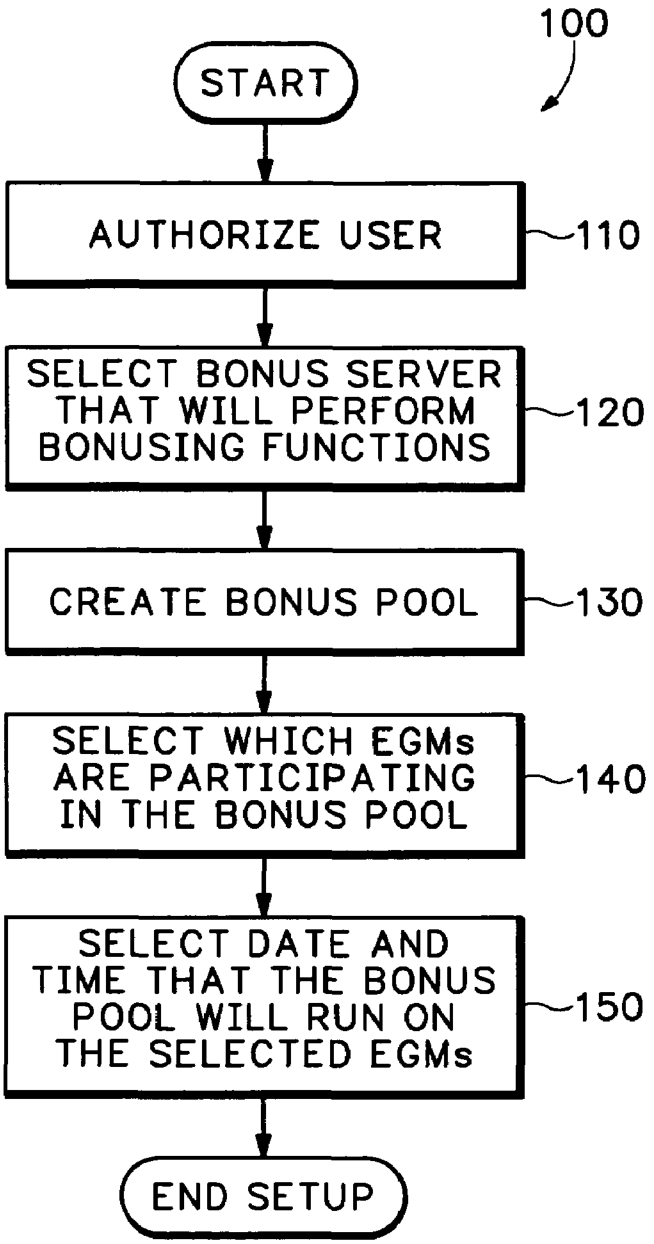
FIG. 2 is an example flow diagram illustrating processes that can be used to set up a particular bonus system.

FIG. 2 is an example flow diagram showing processes that can be used to configure elements of the bonus system for implementation on the gaming network 10 of FIG. 1. The processes could be implemented anyplace within the gaming network 10. In some embodiments the processes shown in FIG. 2 are implemented by computer programs operating on the configuration workstation 40 of FIG. 1.

As mentioned above, a bonus system includes one or more bonus pools. Generally, in embodiments of the invention, a bonus pool is one particular instance of a bonusing process that has a pre-set sum of money to be paid over a pre-set duration that the pool is operating. The collection of bonus pools, and the implementation of operating the separate bonus pools makes up the entire bonusing system.

A flow 100 begins in a process 110 by a user being authenticated to access the bonus system setup. Such a process could be, for example, a logon function of a computer program operating on the configuration workstation 40. Once authenticated, in a process 120 the user selects which bonus server 44, 46 will run the bonus system. As mentioned above, there can be several separate bonus servers operating on a single gaming network 10. Process 120 determines which of the bonus servers 44, 46 will be implementing the particular bonus pools set up in the flow 100.

The user authenticated in process 110 creates an individual bonus pool in a process 130 by providing a name for the pool, determining how much money will be in the pool, and specifying how many different bonus awards (if more than one) will be part of the bonus pool. Naming the bonus pool allows the user to easily identify individual bonus pools within the bonus system. Details of defining the bonus pool are discussed with reference to FIG. 3 below.

Next, in a process 140 the user determines which EGMs will participate in the bonus pool. With reference to FIG. 1, a bonus pool may include every EGM coupled to the gaming network 10, or could include only EGMs in a single bank 16, 18, 20. The user could even select only a few EGMs located in one or more banks 16, 18, 20. Generally, a casino will want to have many EGMs participating in a particular bonus pool so that many players are eligible for the bonus. In some embodiments, pre-defined groups can appear in a process window operating on the configuration server 40 for easy selection. For instance, one group displayed may include all of the EGMs in one bank 16, 18, 20. Or, one group may include all of the EGMs in a particular location of a casino, no matter which bank the EGMs belong to. If groups of EGMs are predefined, then the user need only select one of the pre-defined groups to participate in the bonus pool, rather than individually selecting each of the EGMs participating in the particular bonus pool.

In a process 150, the user selects the date and the beginning and ending times that when the particular bonus pool will run on the associated EGMs. This information is transmitted to the particular bonus server 44, 46 that will be implementing the bonus system. Then, on the appropriate date at the beginning time, the bonus server 44, 46 implements the particular bonus pool defined by the flow 100 of FIG. 2. Implementation of the bonus pools of the bonus system will be described with reference to FIG. 4 below.

Embodiments of the invention include a default master scheduling function that allows an authorized user to schedule which individual bonus pools of the bonus system will be active in a particular casino at any given time. For instance, bonus pool "A", which includes all of the EGMs in a casino, may be scheduled to be in operation between 6:00 am and 7:30 am of a given day. Then, bonus system "B", which only includes the EGMs from bank 16, may be scheduled to operate between 4:30 pm and 7:00 pm in the afternoon for that day. In more advanced embodiments of the bonus scheduling process, a default bonusing schedule can be set up, so that the bonus system schedule above is repeated each weekday. For example, bonus pool "A" could be the default to run every weekday morning and bonus pool "B" could be the default to run every weekday afternoon. If no schedule changes were made, the default program would be implemented at the correct time by the bonus server 44, 46 on the gaming network 10. Otherwise, the default program could be overridden for a customized schedule. For example, it may be desirable to run another bonus pool, bonus pool "C", for a special July 4$^{th}$ bonus that happened to fall on a weekday.

FIG. 3 shows a sample payout table 200 for a bonus pool. In particular, an information box 210 shows that this is the payout table for the Bonus Pool A which was defined by a user as described above with reference to FIG. 2.

The payout table 200 includes an index number which is used to indicate what amounts are awarded by the bonus pool A. Individual indexes are shown as rows in the table 200. Although there is no theoretical limit on the number of indexes a particular bonus pool may have, there may be practical limits. The payout table 200 includes positions for nine indexes.

Each individual index is divided into "n" different possibilities of payout amounts. There is no limit to the number "n" can be, but in some embodiments, "n" is limited to ten different payout amounts for convenience. In operation, this means that a particular bonus pool having ten payout award amounts can pay up to ten separate bonus awards over the time the particular bonus pool is running on the EGMs.

Index 0 is defined to have no payouts. Providing this option allows a manager of the bonusing system to easily disable the bonus pool by selecting the index 0. Other indexes have payout amounts, although not all indexes use all "n" payout amounts. For instance, index "1" has three payout amounts of $1500, and the remaining payout amounts are each $100. Index "3" only has a single payout amount of $25,000.

Some embodiments of the invention assign the individual awards in a given bonus pool in the order the amounts are entered into the bonus table 200, while other embodiments assign the individual awards randomly. For instance, assume that bonus pool "A" includes ten different payout amounts and index "4" is selected. In embodiments that award the bonus amounts in the order shown in the table 200, the first nine bonus awards will be for $100 each, with the final bonus award of $25,000. In embodiments that award the bonus amounts randomly, the $25,000 could be any of the ten bonuses awarded by the bonus pool A.

Embodiments of the invention allow complete control of how much total payout money is in a particular bonus pool, and how the total payout is divided into separate awards, if so divided. An authorized user is able to add, modify and delete indexes specified in the pay table 200, with the exception of index "0", which remains with all payout fields of "0".

Once the bonus pool is set up and scheduled to operate, the bonus server 44, 46 that will implement the bonus pool simply waits until the proper time is reached to begin. Before the bonus award time begins, the casino may use the message screen 28 and or the sound apparatus 26 (FIG. 1) coupled to bank controllers 24 to present audio and video messages to its patrons. Additionally, or in the alternative, each EGM may include its own audio and video device to present the messages. The messages can be stored on the bank controller 24 itself, or may be stored in conjunction with the particular bonus pool stored on one of the bonus servers 44, 46. One such message presented at an EGM could be an indication of whether the particular EGM is one of the EGMs eligible to win a bonus award. In other words, an indicator message, such as a light or lighted bezel allows the player to easily determine if the EGM at which they are playing is eligible to win a bonus award.

Figure 4:
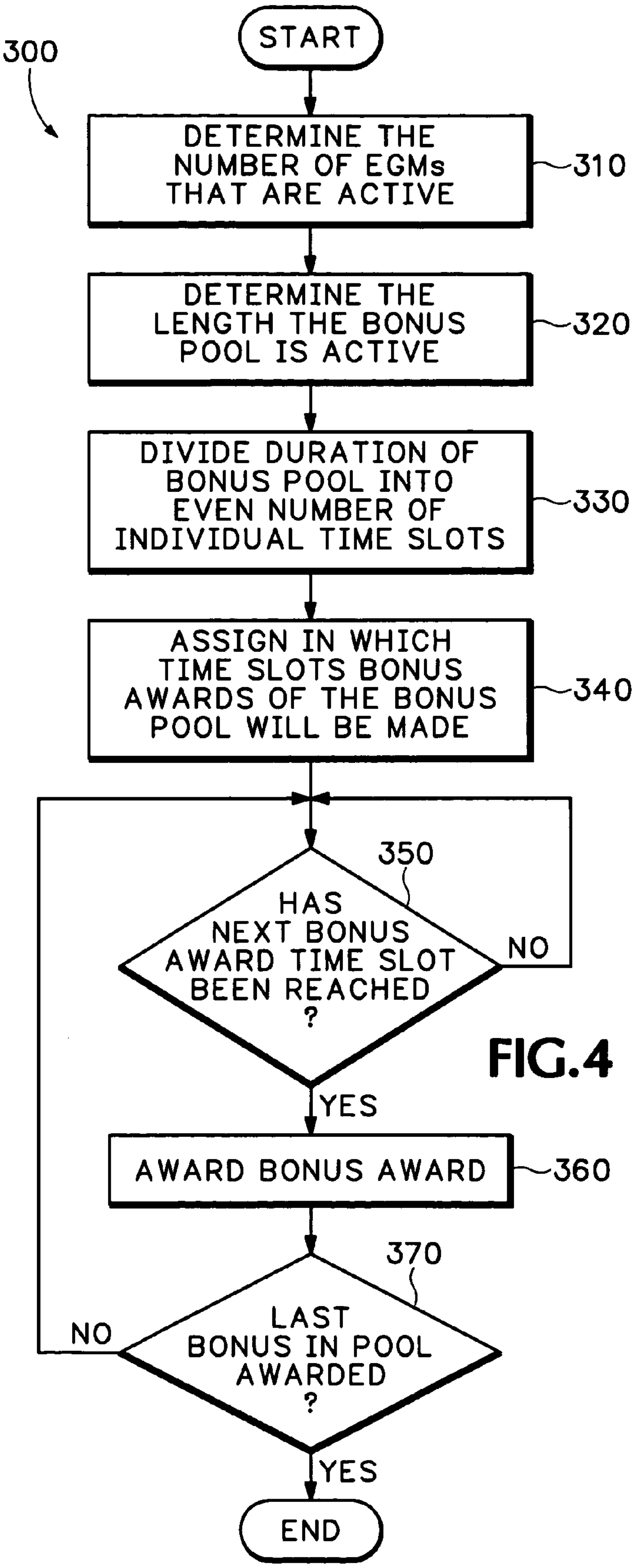
FIG. 4 is an example flow diagram illustrating processes that can be used to implement a particular bonus pool.

Once the bonus award period begins, the bonus server 44 or 46 implements the bonus system. FIG. 4 is a flow diagram showing example processes that can be used by the bonus server 44, 46. A flow 300 begins at a process 310 that determines the number of machines that are both active and eligible to participate in the bonus award. Recall that not all of the EGMs in a gaming network 10 may be selected to participate in the bonus awards, and the list of eligible EGMs is part of the bonus pool setup. The process 310 determines which of the eligible EGMs are in use. One way to perform this process is to determine when the last time a coin or other monetary value was entered into the EGM. If coins were recently entered, it is likely that a patron is still playing games on the EGM, and therefore that EGM would be considered "active".

The process 310 could be a continuing process that is operational at all times during the bonus period. For instance, a machine that no one is playing would not be an active game. When a patron begins to play a game at an EGM, the machine then becomes active. In some embodiments of the invention, EGMs that are not being actively played at the beginning of a bonus period can never become an active game, even if a patron begins playing the EGM. In other embodiments, an EGM can become active no matter when play begins, even if the bonus period has already started. As described above, the EGM may have an indicator, such as an indicator light, message on a screen, or a lighted bezel to indicate to the player whether the particular EGM is an active game eligible to participate in the bonus pool.

In some embodiments, the process 310 creates an active game list that is stored on the gaming network 10, for instance on the bonus server 44, 46. As players begin playing EGMs or leave EGMs that they have been playing, the process 310 actively adds and removes EGMs from the active game list. This updating can be performed in real time or very near real time, for example.

In a process 320 the time duration that the bonus pool is to be active is retrieved from the scheduling record data stored on the bonus server 44, 46. Then, in a process 330, the duration is divided into a number of individual timeslots. For instance, if the duration of the active bonus pool is one hour, then the process 330 could establish 3600 individual timeslots, having a duration of one second each.

Then, referring to the number of payout amounts that were defined for the particular index (FIG. 3) that is currently selected for the active bonus pool, a number of winning timeslots are selected in a process 340. The winning timeslots could be randomly generated or pre-determined. For instance, with reference to FIG. 5A, assume, for illustration, that there are 30 individual timeslots during which the bonus pool is active. Also assume that index 6 of Bonus Pool A is currently selected, so there are five payout amounts in the currently selected index. In this example, the process 340 could assign winning timeslots evenly, i.e. every six timeslots. Or, with reference to FIG. 5B, the timeslots may be assigned such that there are more winners near the end of the bonus pool duration.

Further, with reference to FIG. 5C, the winning timeslots could be randomly assigned from all of the timeslots. The randomizing process could occur on the bonus server 44, 46. As true with all randomizing processes with more than one selection, a decision must be made whether to replace a timeslot that was previously selected as a winning timeslot back in the pool of potential winning timeslots. If replacement were not used, then there will be exactly as many winning timeslots as there are bonus prizes awarded. If for instance there were five bonus prizes available, then exactly five separate timeslots will be selected as winning timeslots. If, however, winning timeslots are replaced back into the pool of potential winning timeslots, then a particular timeslot may be selected multiple times as a wining timeslot. For instance, with reference to FIG. 5D, assume there are five bonus prizes awarded in the bonus pool. Timeslots 4, 6, 11 and 17 are randomly chosen as winning timeslots and timeslot 17 is randomly chosen twice as a winning timeslot. In such an occurrence, one solution would be to award as many bonus prizes as the number of times the timeslot was chosen. For example, one bonus prize could be awarded at timeslots 4, 6, and and two bonus prizes awarded at timeslot 17. However, an easier implementation is to limit the number of prizes awarded at any given timeslot to one, i.e., do not replace timeslots randomly chosen as winning timeslots back in to the pool of potential winning timeslots.

As shown in the above examples, process 340 may select any of the timeslots created in process 330 as winning timeslots.

Returning back to FIG. 4, the bonus server 44, 46 then waits for a winning timeslot. A process 350 continues to loop until a winning timeslot is reached. When a winning timeslot is reached, the payout amount from the particular index of the active bonus pool is awarded to a random one of the eligible EGMs in a process 360, as is known in the art. In practice, for instance, the process 360 may select a random one of the EGMs from the "active EGM list", which, as described above is updated in realtime. That way the bonus system is relatively sure that there is a player actively playing the winning EGM. In one example system, after a winning EGM is selected, the bonus award is not distributed until after a player starts a new game on the EGM. The start of the game must occur within the selected EGM within a short time, for example a few seconds, otherwise another EGM is selected as the winning EGM.

There are many ways to actually award the bonus in the process 360, as is known in the art. For instance, the bonus may be sent to the winning EGM in the form of credits placed on the EGM. Or, the bonus server 44 could automatically lock the winning EGM and deliver the bonus award in a handpay. Additionally, if the player of the winning EGM is known by the player server 42 (FIG. 1) by the player of that EGM having previously identified himself or herself, then the player's account could be automatically credited without ever placing the credits on the EGM.

The bonus award itself need not be limited to money or credits, but could be any type of award. For example, a vacation could be awarded to a player, as could merchandise such as a car. Other types of awards could include complementary services like a free meal or free lodging.

As mentioned above, the payout awards made in the process 360 may be made in the order they appear in the payout table 200 of FIG. 3, or could appear in another order, such as a random order. Alternatively, the awards may be sorted by the bonus server 44, 46 prior to distribution. For example, the awards could be made so that the each successive bonus is larger than the one previous. In a further embodiment, the bonus system could present a choice of bonus prizes to the winner and allow the player to choose a desired bonus, such as by pressing a button or selecting from a list of prizes displayed on a touch screen on the EGM. Such a selection system would not be desirable if the bonus awards were only for cash or credits, as the players would always choose the highest amounts. But, such an embodiment could allow the winning player to choose between a new car or a free vacation, for example.

In still other embodiments, the bonus system could present to the winning player a list of all available bonus prizes remaining in the bonus pool and then randomly select one of the prizes as the player's winning prize. Therefore, it is possible to implement a bonus system that randomly selects a timeslot as a winning timeslot, randomly selects an EGM as a winning EGM, and randomly selects one of a group of pre-selected or pre-determined prizes as the bonus awarded to the winning player.

Finally, a process 370 performs a check to determine if the last payment amount in a bonus pool has been awarded; if so, then the flow 300 ends and the bonus pool is no longer active.

With regard to FIG. 4, the individual processes 300 need not be performed in the order set out in the diagram. For instance, the process 310, which determined which EGMs were active, may in fact take place directly before, or as a part of process 360, which awards the bonus payment. Additionally, at least some of the processes in the flow 300 can be performed prior to the bonus period starting in the casino. For instance, once the length of the bonus period and which index is being used in the assigned bonus pool are known, the bonus server 44, 46 can calculate the winning timeslots even before the bonus period begins.

Although a sample gaming network has been described herein, the bonusing system is operable on different types of systems. One of the benefits to such bonusing systems is that they can be scheduled in advance of the bonusing time itself, thus allowing carefully selected parameters and details to be designed into the bonusing system. Additionally, because the parameters are definable, they can be easily explained to patrons. For example, in embodiments of the invention, it is relatively easy to promote a bonusing system in which $50,000 will be awarded between 1:00 pm and 3:00 pm of a given day. This enables a casino to advertise the particular benefits to the player without causing customer confusion.

Implementation of the bonusing system is straightforward in light of the above description. As always, implementation details are left to the system designer. There are many ways to implement the bonusing system, and the ones described herein are only a few of the many methods that can be used. The procedures used for the bonus awards may be implemented in any way, with any components. Inclusion of description or illustration of a function in either the gaming device or the gaming network controller is not dispositive that the function is located in or must be performed there. The bonusing system works even when not all of the elements shown in the gaming network of FIG. 1 are present. For instance, in some embodiments of the invention, the bank controllers 24 are not strictly necessary, and the system could operate without them.

Thus, although particular embodiments for a bonusing system have been discussed, it is not intended that such specific references be considered as limitations upon the scope of this invention, but rather the scope is determined by the following claims and their equivalents.

What is claimed is:

1. In a gaming network including a plurality of gaming devices, a method of awarding a bonus prize comprising:
- determining a duration of a time period in which it is possible for the bonus prize to be awarded;
- dividing the duration into a plurality of timeslots;
- selecting one of the plurality of timeslots as a winning timeslot during which a pre-determined bonus prize will be made; and awarding the pre-determined bonus prize after the winning timeslot has been reached.

2. The method of claim 1 wherein awarding a predetermined bonus prize comprises awarding the bonus prize to a player of one of the plurality of gaming devices.

3. The method of claim 2 wherein awarding the bonus prize comprises crediting the account of the player.

4. The method of claim 1 wherein awarding a pre-determined bonus prize comprises awarding a bonus prize that was selected by a player of one of the plurality of gaming devices.

5. The method of claim 1 wherein selecting one of the plurality of timeslots as a winning timeslot comprises randomly selecting one out of the plurality of timeslots as the winning timeslot.

6. The method of claim 1 wherein there are more than one pre-determined bonus prizes, the method further comprising selecting as winning timeslots as many of the plurality of timeslots as there are pre-determined prizes.

7. The method of claim 6 wherein selecting as winning timeslots comprises randomly selecting as winning timeslots as many of the plurality of timeslots as there are pre-determined prizes.

8. The method of claim 6, wherein awarding a pre-determined bonus prize comprises:

after a first winning timeslot has been reached, randomly selecting one of the more than one pre-determined bonus prizes; and awarding the randomly selected bonus prize.

9. The method of claim 8, wherein awarding the randomly selected bonus prize comprises awarding the randomly selected bonus prize to a randomly selected one of the plurality of gaming devices.

10. The method of claim 6 wherein awarding a pre-determined bonus prize comprises awarding a bonus prize selected by a player.

11. The method of claim 10, further including displaying a visual indication of the more than one pre-determined bonus prizes to the player.

12. The method of claim 1 wherein awarding a pre-determined bonus prize comprises awarding the bonus prize to a randomly selected one of the plurality of gaming devices.

13. The method of claim 1 wherein only a portion of the plurality of gaming devices is eligible to receive the bonus prize.

14. The method of claim 13, further comprising:

generating an indicator on those of the plurality of gaming devices that are eligible to receive the bonus prize prior to the bonus prize being awarded.

15. The method of claim 1 wherein awarding a pre-determined bonus prize comprises awarding a non-cash bonus prize.

16. The method of claim 1 wherein awarding a predetermined bonus prize comprises awarding a non-cash equivalent prize.

17. In a gaming network including a plurality of gaming devices, a method of preparing to award a bonus prize comprising:

authorizing a user as one eligible to prepare the bonus prize;

accepting a starting time of a bonus prize time period;

accepting an ending time of the bonus prize time period;

accepting identification of one or more bonus prizes;

dividing the bonus prize time period into a number of timeslots;

identifying one or more of the number of timeslots as winning timeslots, the number of winning timeslots equal to the number of bonus prizes identified: and awarding one of the bonus prizes after reaching each of the winning timeslots.

18. The method of claim 17 wherein identifying one or more of the number of timeslots as winning timeslots comprises randomly selecting one or more of the timeslots as winning timeslots.

19. The method of claim 17, further comprising scheduling a bonusing process to operate on the gaming network during the starting time and ending time.

20. The method of claim 19 wherein the bonusing process comprises:

identifying eligible gaming devices out of the plurality of gaming devices; and after a first of the winning timeslots has passed, awarding one of the bonus prizes to one of the eligible gaming devices.

21. The method of claim 20 wherein awarding one of the bonus prizes comprises awarding a randomly selected bonus prize.

22. The method of claim 20 wherein awarding one of the bonus prizes comprises awarding one of the bonus prizes to a randomly selected one of the eligible gaming devices.

23. The method of claim 20 wherein the bonusing process is structured to operate on the plurality of gaming devices until all of the bonus prizes have been awarded to eligible gaming devices.

24. A bonusing system, comprising:

a plurality of gaming devices coupled to a gaming network; and a bonus server coupled to the gaming network, the bonus server including:

a scheduler means for pre-selecting when a bonus pool is to be active, the bonus pool having a pre-determined award value in one or more bonus awards, a time calculator means for determining the duration in which the bonus pool is to be active;

a divider means for dividing the duration into a plurality of timeslots;

a selector means for identifying one of the timeslots as a winning timeslot; and a randomizer means for selecting a winning gaming device from the plurality of gaming devices after the winning timeslot has passed.

25. The bonusing system of claim 24, further comprising a bonus transmitter means for delivering one of the bonus awards to the winning gaming device.

26. The bonusing system of claim 24, wherein the selector means is structured to randomly select one of the timeslots as a winning timeslot.

27. The bonusing system of claim 24, further comprising an eligibility function means for including only a selected subset of the plurality of gaming devices as eligible to receive the bonus award.

* * * * *